March 18, 1952 E. P. SYMONS 2,589,307
GRAIN CUTTER
Filed Sept. 30, 1946 5 Sheets-Sheet 2
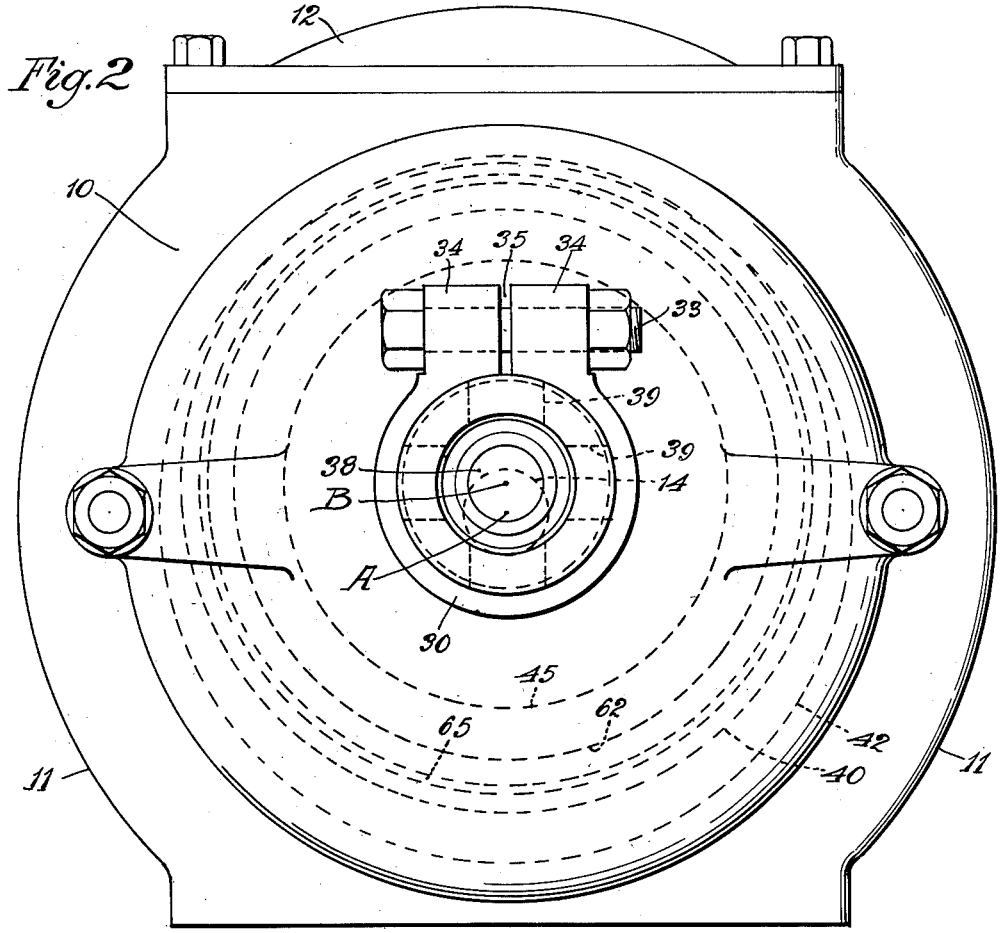
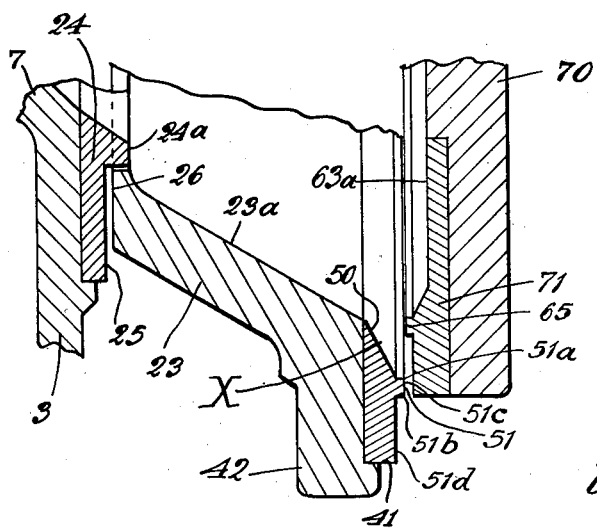
Inventor
Edgar P. Symons
by Parker & Carter
Attorneys

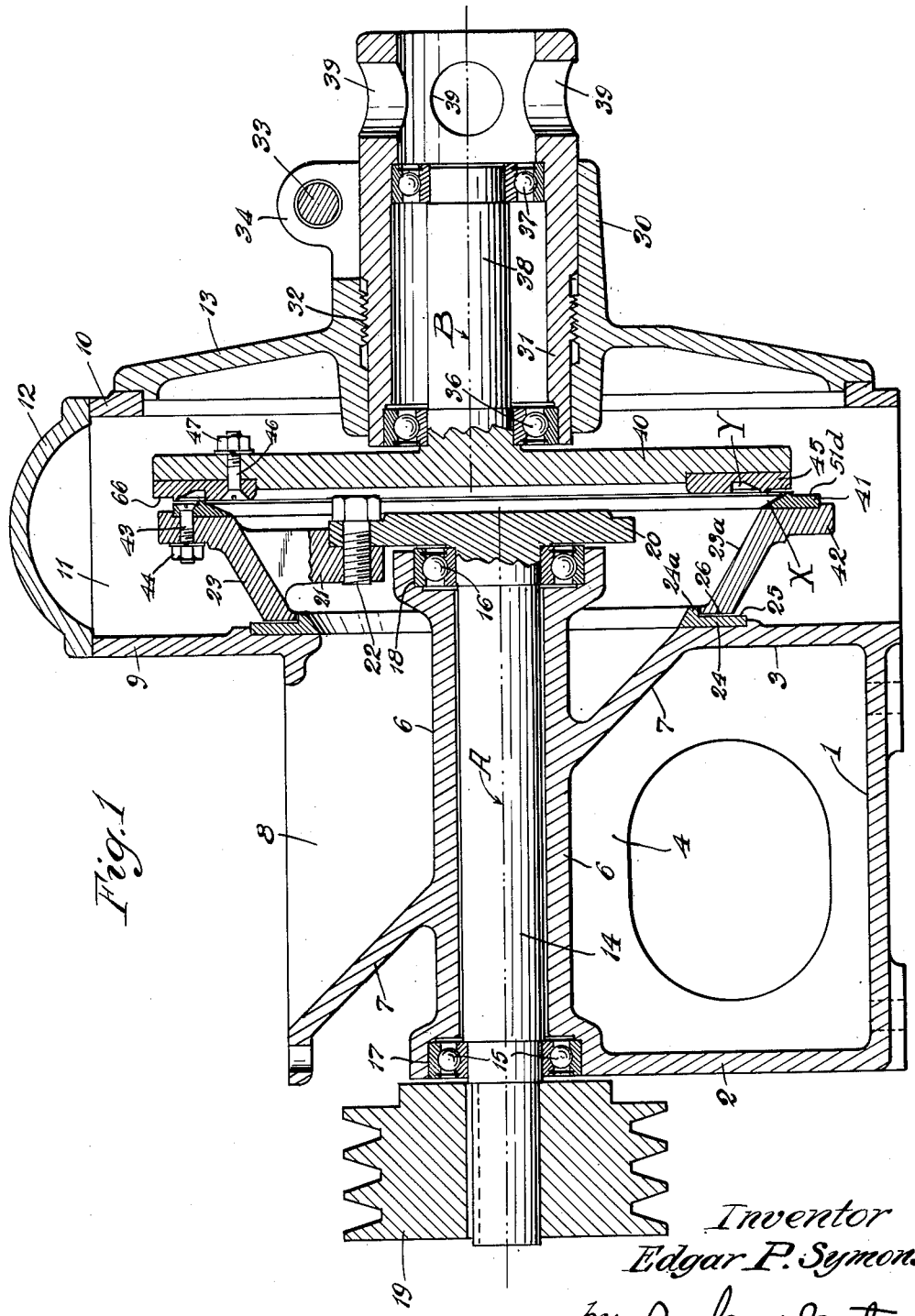

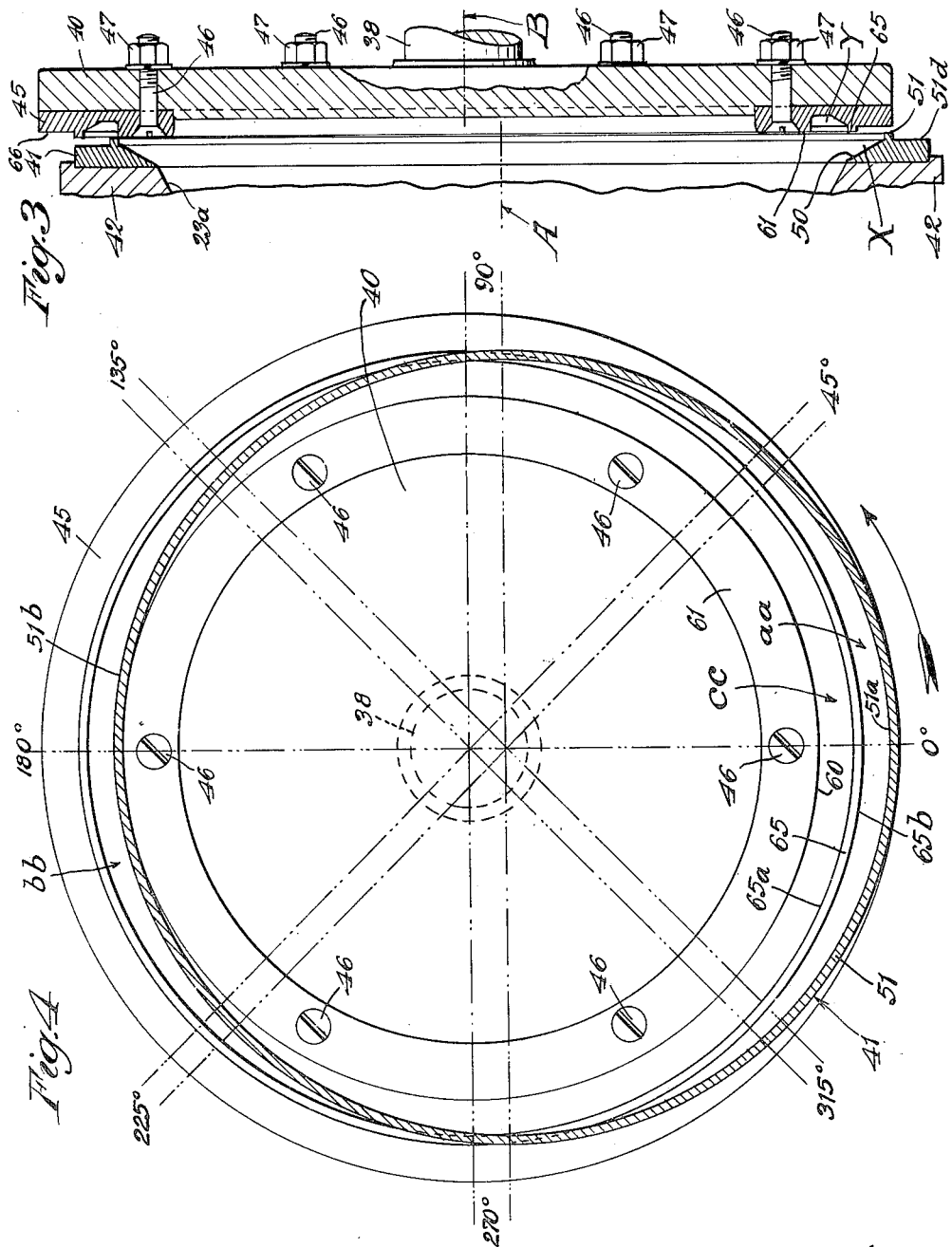

March 18, 1952 — E. P. SYMONS — 2,589,307
GRAIN CUTTER
Filed Sept. 30, 1946 — 5 Sheets-Sheet 4

Inventor
Edgar P. Symons
by Parker & Carter
Attorneys

March 18, 1952  E. P. SYMONS  2,589,307
GRAIN CUTTER
Filed Sept. 30, 1946  5 Sheets-Sheet 5

Inventor
Edgar P. Symons
by Parker & Carter
Attorneys

Patented Mar. 18, 1952

2,589,307

UNITED STATES PATENT OFFICE 2,589,307

GRAIN CUTTER

Edgar P. Symons, Hollywood, Calif., assignor to Symons Brothers Co., North Hollywood, Calif., a corporation of California Application September 30, 1946, Serial No. 700,256

1 Claim. (Cl. 146—71.5)

My invention relates to an improvement in grain cutters and has for one purpose to provide a grain cutter which positively shears the grains with a minimum disturbance of the primary structure of the grain.

Another purpose is to provide a grain cutter and cutting method which insures a minimum separation of husk from kernel and a minimum creation of fines.

Another purpose is to provide a grain cutter in which a scissors action is obtained by rotating opposed circular but eccentric blades in unison.

Another purpose is to provide a grain cutter in which a plurality of cutting edges are employed, effective in either direction of the relative movement of the cutting blades caused by the eccentricity of the axes of the cutting rotor.

Other purposes will appear from time to time in the course of the specification and claims.

The invention is illustrated more or less diagrammatically in the accompanying drawings wherein:

Figure 1 is a vertical axial secton;

Figure 2 is an end elevation;

Figure 3 is a partial diametric section;

Figure 4 is a transverse section illustrating a diagrammatic development of the cutting action or cutting zones of the structure shown in Figure 3;

Figure 5:
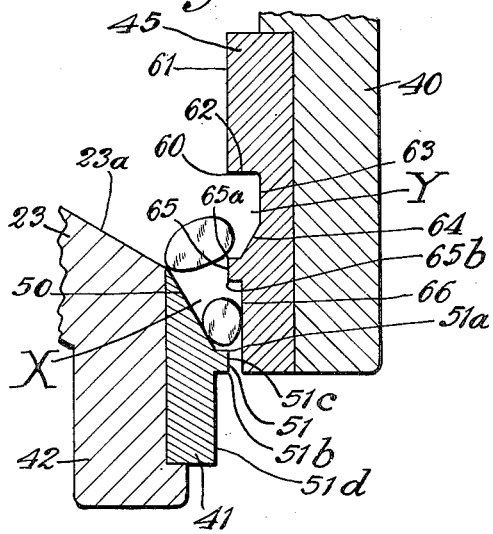

Figures 5 to 12 inclusive illustrate various stages of the shearing operation, at various angles of movement from the zero angle illustrated at the bottom of Figure 4; and Figure 13 is a partial vertical axial section illustrating a variant form of the device.

Like parts are indicated by like symbols throughout the specification and drawings.

Referring to the drawings, for example to Figure 1, I generally indicates a base structure having upwardly extending transverse members 2, 3 and any suitable connecting webs such as 4, apertured for lightness and accessibility. 6 indicates a sleeve structure which intersects a hopper structure 7 having an open topped receiving aperture 8. 9 is a housing wall, shown as an upward extension or alignment of one of the walls 3. 10 is an end rim, suitably connected to the walls 3 and 9 by any suitable side wall structure 11. 12 is a removable top plate. 13 is any suitable removable end cover, which abuts against and conforms to the rim portion 10. Mounted for rotation within the sleeve 6 is the shaft 14. It may be suitably mounted in ball bearing assemblies 15, 16, located in recesses 17, 18, at opposite ends of the sleeve 6. At its outer end the shaft 14 carries a pulley 19 which may be belt driven from any suitable motor or power source, not herein shown.

Secured to or forming part of the opposite end of the shaft 14 is a plate 20. Secured to it by any suitable lugs 21 and screws 22 is a circumferential rim 23 of generally conic shape. It is so formed as to constitute, at its lower portion, an extension of the feed hopper 7. A renewable and removable insert ring 24 may be secured to the end plate structures 3, 9, suitably recessed as at 25 to surround and conform generally to the inner edge 26 of the rim 23. It will be noted that the insert 24 has an inside flange 24a which overlies the inner edge of the rim 23. It will be understood that the lugs 21 constitute, in effect, wheel spokes, with adequate space therebetween to permit feed material to flow down the hopper 8, through the ring 24, and downwardly and outwardly across the inner surface of the rim 23.

The closure plate 13 receives or includes a sleeve portion 30 which is slightly eccentric to the sleeve 6. Adjustably positioned therein is an inner sleeve 31. The two sleeves may have interpenetrating threads as at 32. They may be locked at any suitable position of adjustment, along their axes, by any suitable locking bolt or bolts 33 passing through ears or lugs 34 separated by a suitable gap 35. The inner sleeve 31 carries at each end a ball bearing assembly 36, 37 in which is rotatably mounted a shaft 38. To permit ready adjustment of the sleeve 31 in the sleeve 30, I provide suitable apertures 39 in an outwardly extending end of the sleeve 31. The shaft 38 includes or has secured to it an end disc 40. The disc 40 and the opposed rim portion 23 constitute supports for the actual, replaceable cutter members. The cutter member or ring 41 is recessed in the outer circumferential flange 42 of the rim 23. It may be held in position for example by any suitable bolts 43 with locking nuts 44. Opposed to it is the replaceable ring 45 recessed into the edge of the disc 40 and secured for example by any suitable bolts 46, and nuts 47. It will be clear, as from Figure 1, that the axes of the two shafts, and therefore of the opposed cutting members 41 and 45 are parallel but eccentric. The axis of the shaft 14 and the member 41 is indicated at A. The axis of the shaft 38, and of the member 45 is indicated at B.

The function of the opposed cutters or rings 41 and 45 being to provide a sized shear, with a minimum of degradation and as little disturbance as possible of the structure of the grain, the opposed cutting portions are carefully designed to obtain this result. The rings 41 have inner conic surfaces 50 somewhat inclined to the inner conic surface of the rim 23. It terminates in a cutting flange 51 which has an inner cutting edge 51a and an outer cutting edge 51b. As will be clear for example from Figure 5 it is bounded by generally cylindrical walls which form, with the front face 51c, sharp cutting angles. The outer portion of the end face of the ring 41 is recessed as at 51d.

The opposed ring 45 is shown in Figures 5 to 12 as having an inner cutting edge 60 at the end of a plane surface 61. The edge is formed by the cylindrical face 62 which assists in defining a pocket, the inner end of which is formed by the face 63. This face 63 terminates outwardly in a conic surface 64 which terminates in the cutting lug 65 of rectangular form which has an inner cutting edge 65a and an outer cutting edge 65b. Beyond the lug 65 is the plane surface reduced portion 66. As will be seen from Figures 5 to 12 inclusive, this opposed configuration defines a pocket or receiving area X in the ring 41, and a pocket or receiving area Y in the ring 45. The cutting operation results from the relative radial shifting of the cutting lugs or double edged blades 51 and 65. Considering Figures 5 to 12 inclusive in relation to Figure 4, Figure 5 indicates the condition at the zero degree marker of Figure 4. This is the point where the ring 41 is radially farthest out from the axis B of the ring 45. In that position the pocket or receiving area Y is aligned with the lower end or position of the hopper slope provided by the inner conic portion 23a of the ring 23.

The pocket or receiving space X is open topped with the cutter blades 65 aligned with the upper edge of the surface 50. In Figure 5 the particle is shown spanning the top of the space thus formed. It will be understood, however, that in practice a substantial flow, possibly a choke feed, of grain or material to be cut will be flowing down the hopper 8. The rapid rotation of the shaft 14, at a rate of for example 1800 to 2500 R. P. M., will maintain a centrifugal thrust of material between the members 23 and 40. The shaft 14 will be positively driven, and the opposite plate 40 will be frictionally driven by its contact with the centrifugally thrust mass of material undergoing shearing. This mass will tend to fill the pocket Y and press down into the pocket X, at the position of Figure 5.

Figure 6:
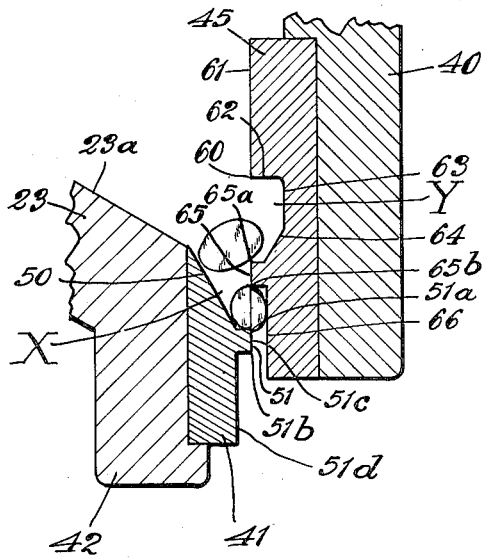

At the position of Figure 6, the two rings will have rotated in unison a distance of 45° of arc. The cutting blade 65 will be moved radially outwardly in relation to the cutting blade 51 and will have a shearing action on any particles actually in the space X. However, the separation along the axis of the device, between the outer face of the cutter blade 51 and the reduced portion 66 serves as a gauge for defining the thickness of the slits or cuts which result from the relative movement of the blades 51 and 65.

Figure 7:
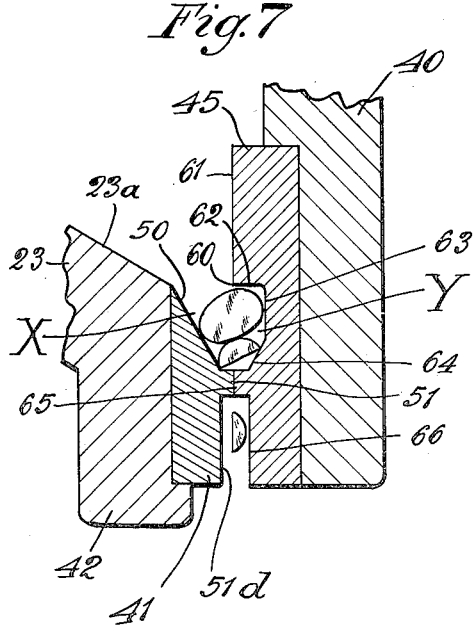

At Figure 7, the total travel is 90° of arc, and it happens that at that point the blades 51 and 65 are directly opposed. The sheared or cut material is free to move centrifugally outwardly between the opposed reduced ring faces 51d and 66. The two pockets or spaces X and Y are also opposed and have received centrifugally feed material.

Figure 8:
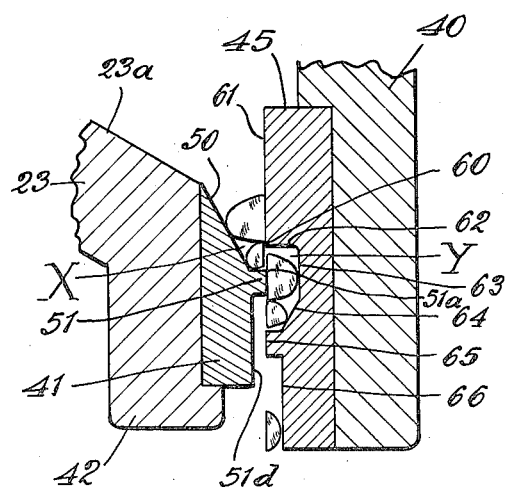

At the Figure 8 position, after a total travel of 135°, the blade corner 60 begins to operate in conjunction with the upper corner 51a of the cutting blade 51.

Figure 9:
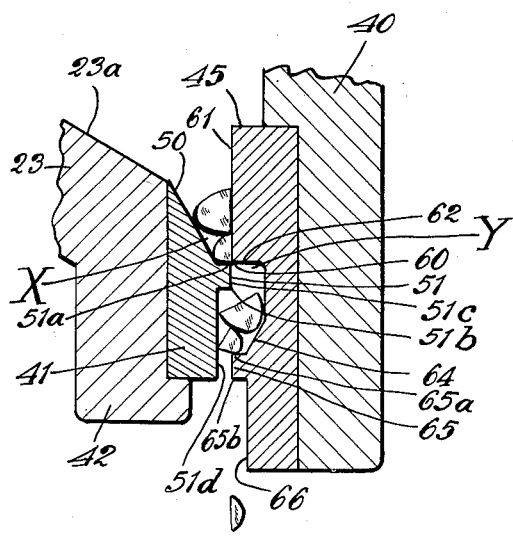

At the Figure 9 position, after another 45°, the pocket or space Y is radially outwardly beyond the space X, and is filled with material which has received an initial cut. This material may be somewhat larger than the material which is finally discharged from the cutting zone. The Figure 9 or the 180° position indicates the end of the relative outward movement of the ring 45. Thereafter the relative movement is reversed, since the initial point on the two rings, which has theoretically travelled around the axes A and B has passed beyond the radial line which passes through the two axes.

Figure 10:
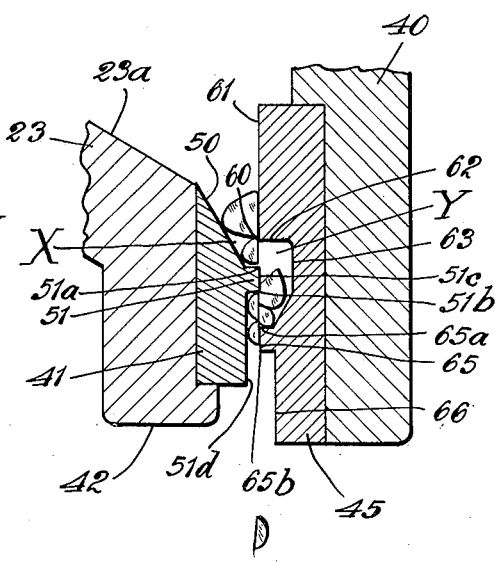

At Figure 10, or the 225° position, the upper edge 65a of the cutter ring or blade 65 is operating against the lower edge 51b of the cutter blade 51. A gauged shear or slice will result and the substantially uniformly sized cut particles will feed centrifugally outwardly.

Figure 11:
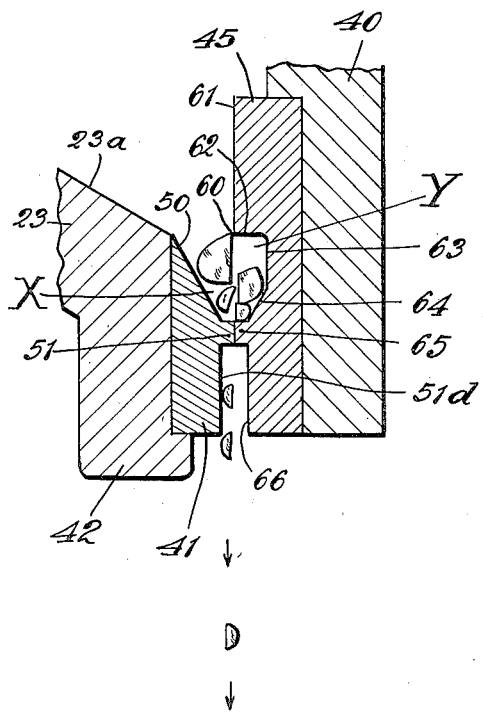
Figure 12:
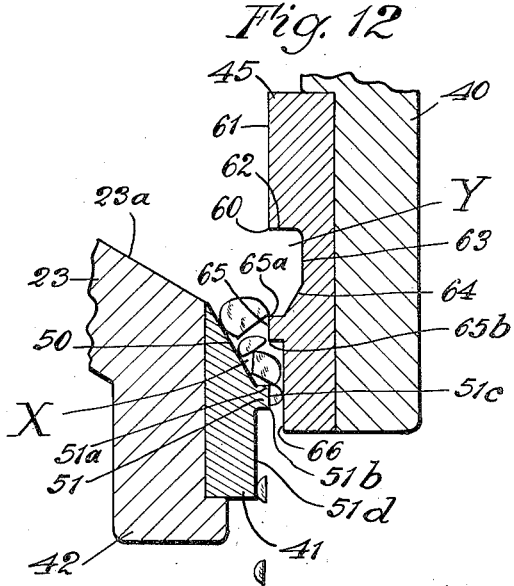

At Figure 11 position, or the 270° position the pockets or spaces X and Y are again aligned, to form a single large receiving pocket. However, the ring 45 continues its movement toward the axis of the ring 41 and the material in the pocket or space X is able to slide outwardly into the space below the blade 65, as shown in Figure 12. This direction of movement continues until, after another 45°; the parts are back in the initial position of Figure 5.

The cutting zone, or the separation on the shearing side between the opposed edges is indicated on Figure 4. The initial shear between the inner edge 51a of the ring 41 and the outer edge 65b of the ring 45 is indicated by the area of cutting nip at aa of Figure 4. The maximum separation is at the zero degree position, and the shear takes place shortly before the 90° position is reached. A corresponding shear, in the opposite direction between the opposed opposite edges of the cutting flanges 51 and 65 is indicated at bb in Figure 4, starting at the 180° position and terminating shortly before the 270° position. Whereas the edge 60 need not be employed, it is of advantage and the efficiency of the device is definitely improved by the initial cut of the edge 60 against the inner cutting edge 51a. The zone of shear indicated at cc of Figure 4 extends from the zero position about to the 150° position owing to the larger separation between the two opposed edges.

It will thus be evident that a positive, sized, controlled shear is obtained which includes the following factors.

1. The relative movement of the opposed edges is caused by the eccentricity of the axes of two opposed circulating blades.

2. The centrifugal thrust feeds the particles to a receiving zone or zones, where they extend into the path of the converging cutting edges.

3. The cut is gauged by the height of the cutting flanges 51 and 65, assuming that the surfaces of these flanges are in contact. This gauge in operation will be clear from Figures 5 and 6, in which the particle engages the surface 66 and is sheared to the height of the cutting flange 65.

The primary object being to cut or split the grains without excess fines, a determining factor is the minimum size of the grain to be split or sheared. The gauging shoulder, for example, the distance between the surfaces 51c and 51d is less than the size of the smallest grain to be split.

As will be clear from a comparison of Figures 5 to 12, inclusive, the clearance between the blade 65 and the top of the pocket X constitutes a limitation which prevents entry of oversize particles into the pocket X. The blade 60 when used, provides an initial means for reducing the diameter of oversize particles, or of giving an initial cut to particles of normal diameter. This action is indicated, for example, in the progress from Figure 7 to Figure 9.

There is a minimum of mass crushing. In effect, by the surface 50, there is a camming thrust against an opposed gauging surface 66. The inner opening of the pocket X, at the zero position, constitutes a definite means for preventing the entry of oversize particles, unless or until they have been reduced by the initial shear of the edge 60.

The capacity of the device is doubled, by the fact that there is a positive shear in the reverse direction, indicated in the zone bb of Figure 4.

The spokes 21 act as paddles to whirl the feed. They may be cut back on the side of approach of the feed. The obstruction of the sleeve 6 and the hub 20 may be advantageous, as providing a loose zone and preventing a complete filling up of the area of delivery to the actual cutting zone.

An advantage of the cutter is the fact that it has, in addition to its cutting or shearing, a gauging action, and a positive sizing action. The particles are centrifugally urged against a gauging surface, at least in part by a camming action. A uniform slice is cut, with a minimum disturbance of the primary structure of the grain.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing. For example, as shown in Figure 13, I may employ a driven rotor, shown at 70, with a ring or insert 71 in which the inner surface 63a extends inwardly throughout the rest of the ring, the corner 60 and the face 62 being omitted. Thus one of the initial cuts, as illustrated, for example, at Figure 8, cannot be performed by the form of Figure 13.

The use and operation of my invention are as follows:

My invention is directed primarily to an apparatus and method for cutting feed. It is highly important, in feeding animals, that the essential primary structure of the grain be not disturbed. This is important in maintaining a balanced food value. The husk must be cut, with the kernel, and, in the course of the cutting or shearing, the essential balance of the various parts of the grain must be maintained. In my method and apparatus, oats, wheat, barley and other small grains may be fed, in the husk, or with a surrounding layer still in place, and the cut or shear does not pulverize the inner kernel. There is a minimum of separation of husk from kernel. This is a creation of a relatively small proportion of fines.

The coarse limiting zone, or reduction of size of particles admitted, including the use of the surface 61 and the cutting edge 60, will probably always be necessary with corn, but probably not with wheat. Even with the portions 60, 61 omitted my cutter will cut the smallest grains at least once, and will deliver a sized feed.

It is important that the wear taking parts be removable for replacement. Thus the annuli 24, 41 and 45 are all removably secured in place.

One important feature of my cutter is the accurate gauging of the size of the particles, which results from the fact that the opposed gauging surfaces of the two discs are substantially parallel and are perpendicular to the axes of the discs. Another advantage is that the cutter herein shown has a maximum output with a minimum heating of the grain. It should be understood that one of the largest obstacles to be overcome in any type of grain cutter, particularly when the grain is wet, is heating. Any grain cutter or grinder which heats the grain destroys the food value of the grain. This is particularly the case in mills, such as attrition mills, where the individual grain particles are cut or ground a plurality of times before they escape from the mill. In the above described mill the material reaches the cutting cavity with a minimum of friction, and is at once cut. The cut particles are immediately ejected from the machine without any recutting or grinding.

In the use of the device, cutting takes place simultaneously on two sides of the mechanism, the cutting taking place, at each of two cutting zones, with a gauged, single cut, followed by immediate ejection of the cut particles. The eccentric rotation of the two discs or rings or members also obtains a certain agitation of the grain in the central cavity. This agitation is effective to maintain a smooth feed of the grain to the actual cutting zones.

I claim:

In a rotary cutter for grain and the like, a rotor including a feed-receiving portion and a surrounding cutter area having a cutting ring surrounded by an exterior plane gauging cavity of uniform depth and outwardly open to the edge of the rotor, a second rotor having a circumferential cutting ring and a similar surrounding gauging cavity, said second rotor being apertured for the delivery therethrough, toward the first rotor, of material to be cut, and means for rotating said rotors about parallel but slightly eccentric axes, said cutting rings having opposed and closely adjacent cutting surfaces, the surfaces of said gauging cavities being parallel and perpendicular to the axes of said rotors and of equal depth in relation to the cutting surfaces of said rings, the radial width of the cutting rings being substantially less than the amount of eccentricity between the axes and the radial width of both the cutting ring and the gauging surface on each rotor being greater than the amount of eccentricity.

EDGAR P. SYMONS.

REFERENCES CITED

The following references are of record in the file of this patent:

UNITED STATES PATENTS

| Number | Name | Date |
| --- | --- | --- |
| 29,010 | Ruof et al. | July 3, 1860 |
| 192,208 | Wilson | June 19, 1877 |
| 315,143 | Hudson | Apr. 7, 1885 |
| 905,492 | Bauer | Dec. 1, 1908 |
| 1,057,427 | Higbee | Apr. 1, 1913 |
| 1,269,399 | Davis | June 11, 1918 |
| 2,126,361 | Urschel et al. | Aug. 9, 1938 |

FOREIGN PATENTS

| Number | Country | Date |
| --- | --- | --- |
| 21,928 | Germany | May 18, 1883 |